Feb. 2, 1954 B. B. BAUER 2,668,196

PHONOGRAPH APPARATUS

Filed April 30, 1949 2 Sheets-Sheet 1

INVENTOR.
Benjamin B. Bauer
BY
Thiess, Olson & Mecklenburger.
Att'ys

Feb. 2, 1954 B. B. BAUER 2,668,196

PHONOGRAPH APPARATUS

Filed April 30, 1949 2 Sheets-Sheet 2

INVENTOR.
Benjamin B. Bauer
BY
Thiess, Olson & Mecklenburger
Att'ys

Patented Feb. 2, 1954 2,668,196

UNITED STATES PATENT OFFICE 2,668,196

PHONOGRAPH APPARATUS

Benjamin B. Bauer, Oak Park, Ill., assignor to Shure Brothers, Incorporated, Chicago, Ill., a corporation of Illinois Application April 30, 1949, Serial No. 90,687

5 Claims. (Cl. 179—100.41)

This application is a continuation-in-part of the application of Benjamin B. Bauer, Serial No. 771,433, filed August 30, 1947, entitled "Phonograph Apparatus," and the invention hereof relates to phonograph translating devices, more particularly to such apparatus for reproducing sound from records, and it is an object of the invention to provide improved apparatus of this character.

Phonograph translating devices for reproducing sound from records, termed pickups, frequently are in the form of cartridges which comprise a casing having a translating element and a coupling structure therein. Terminals in the form of prongs connected to the translating element extend from one end of the casing for easy and rapid insertion into corresponding sockets in the phonograph tone arm. A record engaging needle or stylus is arranged to project through the casing adjacent the other end for following record grooves, the stylus being attachable to the coupling structure by means of a screw, for example, usually also projecting from the casing where it is engageable by hand or with a tool. The coupling serves to transmit mechanical movements or some function thereof from the stylus to the translating element, and the translating element serves to convert the transmitted mechanical movements into electrical variations which are transmitted through the cartridge terminals to the phonograph amplifier or other reproducing device. For high quality reproduction, the sound output from the phonograph should be substantially free from extraneous noises such as needle and record talk which are sounds radiated directly to the atmosphere because of the vibrations of the stylus, the coupling structure, and the record itself.

Accordingly, it is a further object of the invention to provide a pickup embodying improved stylus and coupling structure whereby extraneous noise due thereto is reduced to a minimum.

It is a further object of the invention to provide an improved phonograph pickup wherein the transducing element functions by being placed under simple bending stresses.

It is a further object of the invention to provide, in a phonograph pickup, an improved coupling structure between the pickup stylus and the transducing element.

It is a further object of the invention to provide, in a phonograph pickup utilizing a piezoelectric element functioning by being placed under simple bending stresses, an improved coupling structure between the pickup stylus and the piezoelectric element.

There have been developed phonograph record players utilizing a very fine groove, commonly termed a microgroove, records having such microgrooves requiring a needle or stylus having a much finer point than do records having ordinary grooves. Consequently, if it is desired to change from a record having a regular groove to one having a microgroove, it is necessary to change styluses as well. This is disadvantageous. Accordingly, it is a further object of the invention to provide an improved pickup, for phonograph records of the character indicated, embodying structure wherein both types of styluses may be mounted thereon.

It is a further object of the invention to provide an improved phonograph pickup of the character indicated having provision for two styluses.

In carrying out the invention in one form, a phonograph translating device has been provided comprising, a casing, a piezoelectric element mounted in the casing for bending deformation, a vertical rotational member mounted in the casing including means at one end for receiving a stylus, and coupling means between the piezoelectric element and the vertical rotational element whereby the piezoelectric element is placed in bending stress upon rotation of the vertical rotational element.

For a more complete understanding of the invention, reference should be had to the accompanying drawings in which.

Figures 1, 2, 3:
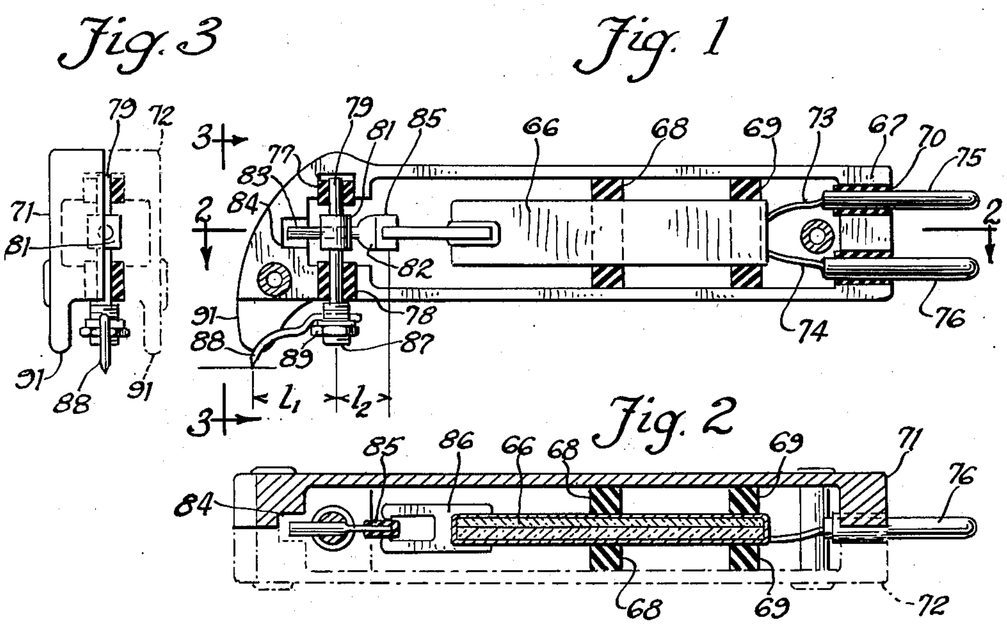
Figure 1 is a vertical sectional view of a pickup embodying the invention.
Fig. 2 is a sectional view taken substantially in the direction of arrows 2—2 of Fig. 1.
Fig. 3 is a front elevational view taken substantially in the direction of arrows 3—3 of Fig. 1.

Referring to the drawings there are shown pickups embodying coupling structure in which the crystal or other transducing device is placed under bending stresses.

In the modification shown in Figs. 1, 2 and 3, a crystal 66 is supported within a casing 67 by a pair of resilient pads 68 and 69 made of rubber or an elastomer, the pad 69 being substantially at the rear of the crystal and the pad 68 being in between the rear and forward ends thereof. Casing 67 may be made of any suitable material, such for example as metal or plastic, and consists of a pair of halves 71 and 72 held together by rivets, for example. Leads 73 and 74 extending from the crystal are connected respectively to prongs 75 and 76 by means of which the voltage impulses from the crystal are transmitted to the phonograph amplifying apparatus. Suitable openings are provided in the casing and insulating members 70 are arranged therein for suitably supporting prongs 75 and 76. The structure for placing crystal 66 under bending stress is arranged at the end of the pickup opposite to prongs 75 and 76, and conforming to this, supporting pad 68 is placed in between the crystal extremities in order that the forward extremity may be bent back and forth. For this purpose, crystal 66 is mounted with its flat side vertical in the casing.

At the extreme forward end of the pickup the casing halves are provided with suitable openings in which may be received resilient supporting members 77 and 78, the axis for these members and openings being vertical of the pickup. Centrally held within resilient members 77 and 78 is a vertical rod 79 having an enlarged portion 81 substantially at its center. The lower end of rod 79 extends outwardly of the pickup and is adapted to have a stylus attached thereto as will be explained hereinafter. A hole is drilled through portion 81 transversely with respect to rod 79 and a driving member or paddle 82 is pushed therethrough so that its forward end 83 extends into a recess 84 provided in the pickup casing. The rear end of paddle 82 consists of a flattened portion surrounding which a resilient spacer 85 is placed. A connecting link 86 is bifurcated at each end in order that it may grip paddle 82 and at the same time grip the forward end of crystal 66.

It will be apparent from this construction that whenever rod 79 is rotated about its axis, paddle 82 is oscillated to and fro and moves the end of crystal 66 sidewise with it. Spacer 85 absorbs some undesirable vibrations and cushions shocks.

At the lower end of rod 79 projecting outwardly of the casing, an enlarged portion 87 is provided which is threaded and which has a hole drilled therethrough in a manner described in the parent application Serial No. 771,433.

Stylus 88 is placed within the hole in the enlarged portion 87, and a nut 89 holds the stylus to the stud as described in the parent application. When the point of stylus 88 engages a record having lateral grooves therein, the end of the stylus moves to and fro sidewise and accordingly causes rod 79 to rotate back and forth, this rotational movement placing the crystal under bending stresses.

Connecting link 86 may be shifted into different positions relative to the axis of rod 79 thereby changing the distance $l_2$, that is, the distance from rod 79 to the point where link 86 engages the paddle. Changing the distance $l_2$ relative to the distance $l_1$, i. e. the length from the axis of rod 79 to the point of the stylus 88, varies the leverage exerted by the stylus and thereby greater or lesser bending forces may be obtained, as desired. In addition to the strong bending force obtained by this construction, the effective mass and stiffness is reduced, i. e. by the ratio $(l_2/l_1)^2$. This is advantageous in that a more faithful response is produced in the crystal output.

The rod 79 rotates around its vertical axis. Its effective moment of inertia is small and the contribution of its mass to the mass at the stylus point is therefore small. In this manner, a pickup is produced which has high compliance and good output and yet one which has an extremely small needle mass and stiffness.

In order that excessive movements of rod 79 may not injure crystal 66, the recess 84 in the forward end of the pickup is so constructed that the end 83 of paddle 82 engages the sides of recess 84 whenever the desired limits of movement are exceeded.

Stylus 88 is prevented from being injured by excessive vertical movements by studs or prongs 91 extending downwardly from the forward end of the casing along each side of the stylus as may be seen best in Fig. 3.

Figure 4:
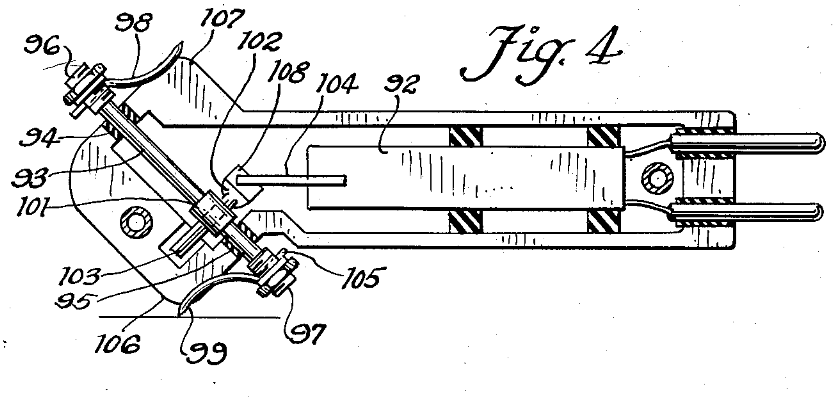
Fig. 4 is a sectional elevational view of another embodiment of the invention.

The embodiment of Fig. 4 is similar in its general arrangement to the embodiment of Figs. 1, 2 and 3, and differs therefrom mainly in that the construction is such that the pickup may be used for two-sided operation. To this end crystal 92 is supported inside of a casing comprising a pair of members. At the forward end of the pickup casing, a shaft 93 is arranged to be supported in suitable openings by means of resilient bearing members 94 and 95. Each end of the rod or shaft 93 projects outwardly of the casing and includes respectively enlarged portions 96 and 97 which are threaded and have holes drilled therein to receive styluses 98 and 99 in a manner described in the parent application.

The angular position of shaft 93 is made such that when two identical styluses 98 and 99 are used, the points thereof lie in a line perpendicular to the horizontal axis of the pickup and point in opposite directions, this being advantageous in order that the same relative point in a record may be engaged by either stylus irrespective of which side of the pickup is being used, provided that the record rotates in one direction for one stylus and in another direction for the other stylus.

Intermediate the ends of rod 93 there is an enlarged portion 101 through which a hole extends to receive a paddle 102, the paddle having a forward end 103 received in a suitable recess in the casing to prevent excessive movements of rod 93. The rear end of paddle 102 is covered with a piece of spacing material 108 and is connected to crystal 92 by means of a bifurcated member 104. Accordingly, it will be seen that lateral movement of styluses 98 and 99 effect a rotational movement of shaft 93 and paddle 102, thereby placing crystal 92 under bending stresses.

The styluses 98 and 99 differ somewhat from the styluses of Figs. 1, 2 and 3 inasmuch as these styluses are held in rod 93 which extends at an acute angle relative to the axis of the pickup rather than at right angles thereto. Secondly, the rear or attaching portion 105 of the styluses is bent upwardly at an angle relative to the forward or curved portion. The curved portions of styluses 98 and 99 are similar to the curved forward portions of the styluses of Figs. 1, 2 and 3, the only difference being in bending the rearward portion so that the styluses will assume proper positions.

The upper and lower members of the casing are also provided with projecting members 106 and 107 on each side of the styluses to prevent excessive vertical movement thereof.

Figure 5:
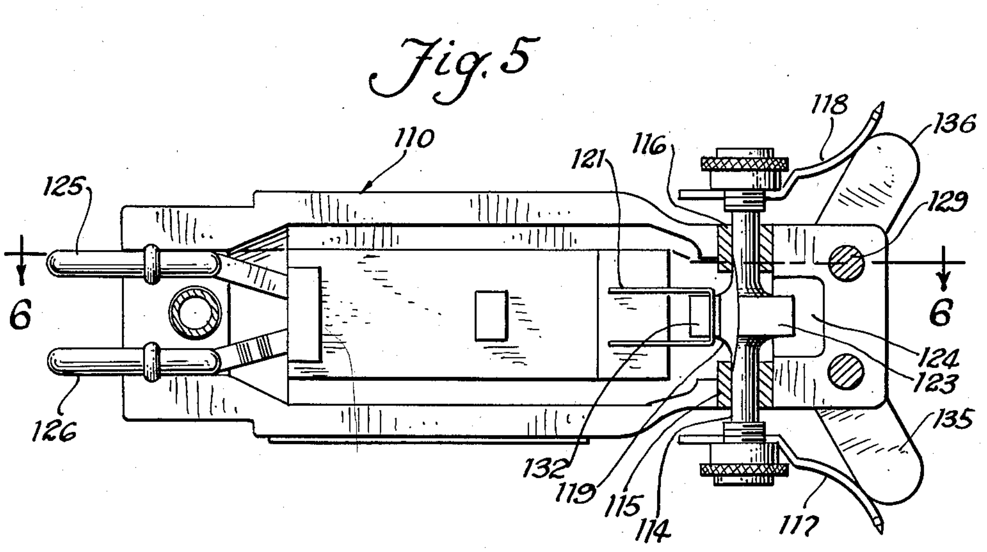
Fig. 5 is a sectional elevational view of a further embodiment of the invention.
Figure 6:
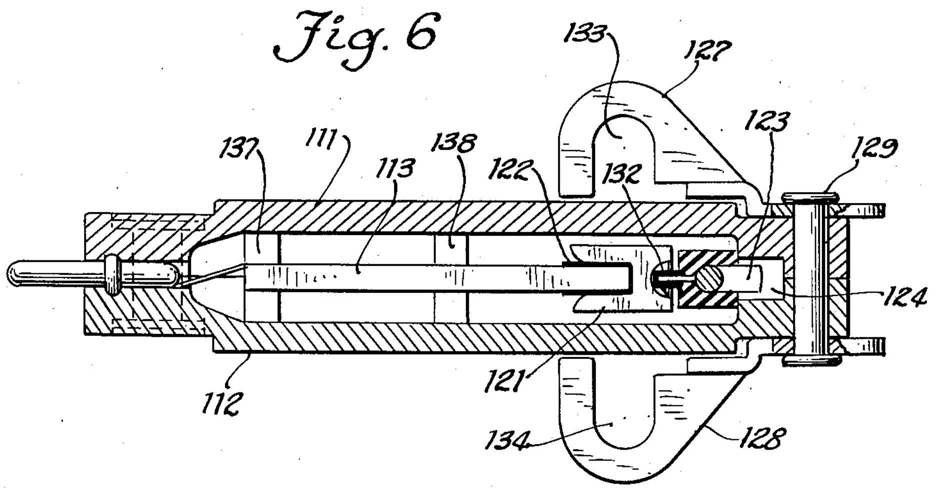
Fig. 6 is a sectional view taken substantially in the direction of arrows 6—6 of Fig. 5.

The embodiment shown in Fig. 5 is similar to the embodiment of Fig. 1. Accordingly, in Fig. 5 there is a casing 110 comprising a pair of halves 111 and 112 within which there is supported a crystal or other piezoelectric element 113. Piezoelectric element 113 is mounted as a cantilever with its flat side vertical, also similarly to the previous embodiments.

At the forward end of the pickup there is a vertical member or rod 114 mounted for rotation in rubber or other resilient material bearings 115 and 116. Each end of rod 114 projects through casing 110 and is provided with structure for holding styluses 117 and 118, as described in the parent application. Substantially centrally of rod 114 there is an extension 119 rigid therewith, which extension cooperates with yoke 121 for transmitting rotational movements of rod 114 as bending movements to crystal 113. Yoke 121 may be formed of a thin material stamped and bent into the configuration shown. The yoke has bifurcated portions at one end which are received around the forward or free end of the crystal, a flexible pad 122 of rubber or similar material being placed between the bifurcations of the yoke and the outside of the crystal in order to lend some resiliency to this coupling. Likewise, a layer 132 of flexible material surrounds extension 119 so that the engagement between these two members also is somewhat resilient.

Similarly to the embodiments described, to and fro movements of the stylus points 117 and 118, when either one of these is being used, will produce rotational to and fro movements of rod 114 which in turn will produce bending movements of the forward end of the crystal through the extension 119 and yoke 121.

To assure that excessive movements of the crystal do not occur, thereby to prevent breaking, an extension 123 is provided on the frontward side of rod 114. Extension 123 is received within a recess 124 having predetermined dimensions so that when movements of rod 114 beyond a certain maximum tend to occur, extension 123 engages with the side walls of recess 124 and thereby limits further movement.

The record engaging points of styluses 117 and 118 may be different so that one may be used for cooperating with a microgroove record and the other may be used for cooperating with an ordinary record, the records rotating in the same direction. When a particular type of record is being played, it is only necessary to pull out pickup 110 and so place it that the proper stylus is in a position to engage the record. The pickup is then placed into active position by inserting the connecting prongs 125 and 126 into the sockets provided therefor. Prongs 125 and 126 may not be sufficient for supporting the pickup, and a pair of wings or brackets 127 and 128 may be attached to the forward end of the pickup, as shown, by rivets 129 to provide additional support. Wings 127 and 128 include openings 133 and 134 respectively for receiving attaching screws.

The pickup is simply reversible, that is, after one stylus has been used and it is desired to use the other one, it is necessary only to turn the pickup over.

For protecting the points of styluses 117 and 118, downwardly projecting pairs of tusks 135 and 136 may be provided.

Crystal 113 is supported in the casing at its rearward end by a pair of flexible pads 137, and approximately centrally of its length by a second pair of pads 138. The front end of the crystal is free so that deflections thereof may occur. With the construction as shown, deflection of the forward end of the crystal produces relatively simple bending stresses. Crystals may be formed sufficiently thin so that bending stresses of the character indicated result in sufficient electrical output.

The points of styluses 117 and 118 lie on a line perpendicular to the axis of the pickup, and the styluses point in the same direction, it being intended that the pickup be turned over if a different stylus is to be used.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. In a mechano-electric transducing device, a bender-type of transducing member, support means for mounting said transducing member at a portion removed from one end thereof to leave said end free, a driving member, means for mounting said driving member adjacent to the free end of said transducing member and for angular oscillation about an axis extending transversely with respect to the plane of motion of a point of said free end, a part fixed to said driving member and displaced transversely with respect to said axis, whereby angular oscillation of said driving member produces to and fro motion of said part, a rigid coupling member having spaced apart arms embracing opposite surfaces of the free end portion of said transducing member and having a portion connecting said arms and extending beyond said free end of said transducing member, said extending portion operatively engaging said part, whereby to and fro motion of said part produces bending deflections of said transducing member, said driving member being apertured transversely thereof to receive stylus means.

2. In a mechano-electric transducing device, a bender-type of transducing member, support means for mounting said transducing member at a portion removed from one end thereof to leave said end free, a driving member, means for mounting said driving member adjacent to the free end of said transducing member and for angular oscillation about an axis extending transversely with respect to the plane of motion of a point of said free end, a part fixed to said driving member and displaced transversely with respect to said axis, whereby angular oscillation of said driving member produces to and fro motion of said part, a rigid coupling member having spaced apart arms embracing opposite surfaces of the free end portion of said transducing member and having a portion connecting said arms and extending beyond said free end of said transducing member, said extending portion operatively engaging said part whereby to and fro motion of said part produces bending deflections of said transducing member, said driving member having two openings therein each adapted to receive a stylus, said openings respectively being displaced axially of said driving member in opposite directions from said part.

3. In a mechano-electric transducing device for use with a phonograph record, a casing, a bender-type of piezoelectric transducing member mounted in said casing and having one end thereof free for bender-type of operation, a driving shaft adjacent to said free end of said transducing member and having its axis disposed at an angle to said record surface in the normal playing position, said driving shaft being mounted in said casing for angular oscillation about said axis and having an end portion thereof extending exteriorly of said casing, a transversely projecting part fixed to said driving shaft, and a rigid coupling member having spaced apart arms embracing opposite surfaces of the free end portion of said transducing member and having a portion joining said arms together and extending beyond said free end of said transducing member, said extending portion of said coupling member being in motion-transmitting relationship with said part, said exterior end portion of said shaft having a transverse opening therein for receiving a stylus.

4. In a mechano-electric transducing device for use with a phonograph record, a casing, a bender-type of piezoelectric transducing member mounted in said casing and having one end thereof free for bender-type of operation, a driving shaft adjacent said free end of said transducing member and having its axis disposed at an angle to said record surface in the normal playing position, said driving shaft having an end portion thereof extending exteriorly of said casing, spaced apart compliant bearings mounted in said casing and supporting said driving shaft for angular oscillation about said axis, a transversely projecting part fixed to said driving shaft between said bearings, and a rigid coupling member having spaced apart arms embracing opposite surfaces of the free end portion of said transducing member and having a portion joining said arms together and extending beyond said free end of said transducing member, said extending portion of said coupling member being connected in motion-transmitting relationship with said part, said coupling member being adjustable upon said transducing member to alter the distance from the axis of said driving shaft to the point of connection of said part and said coupling member, said exterior end portion of said shaft having a transverse opening therein for receiving a stylus.

5. In a mechano-electric transducing device for use with a phonograph record, a casing, a bender-type of piezoelectric transducing member mounted in said casing and having one end thereof free for bender-type of operation, a driving shaft adjacent said free end of said transducing member and having its axis disposed generally perpendicular to said record surface in the normal playing position, said driving shaft having an end portion thereof extending exteriorly of said casing, spaced apart compliant bearings mounted in said casing and supporting said driving shaft for angular oscillation about said axis, a transversely projecting tongue-like member fixed to said driving shaft between said bearings, a rigid coupling member having spaced apart arms embracing opposite surfaces of the free end portion of said transducing member and having a portion joining said arms together and extending beyond said free end of said transducing member, said extending portion of said coupling member being in motion-transmitting relationship with said tongue-like member, a compliant cushioning member between the cooperating surfaces of said coupling member and said tongue-like member, said exterior end portion of said shaft having a transverse opening therein for receiving a stylus.

BENJAMIN B. BAUER.

References Cited in the file of this patent

UNITED STATES PATENTS

| Number | Name | Date |
|---|---|---|
| Re. 20,680 | Sawyer | Mar. 29, 1938 |
| 2,212,530 | Weil | Aug. 27, 1940 |
| 2,280,763 | Hasbrouck | Apr. 21, 1942 |
| 2,381,861 | Bauer | Aug. 14, 1945 |
| 2,479,894 | Andrews | Aug. 23, 1949 |
| 2,484,950 | Jaffe | Oct. 18, 1949 |
| 2,568,673 | Washburn | Sept. 18, 1951 |

FOREIGN PATENTS

| Number | Country | Date |
|---|---|---|
| 488,294 | Great Britain | July 5, 1938 |
| 586,488 | Germany | Oct. 21, 1933 |